United States Patent

Barta et al.

[11] Patent Number: 5,865,374
[45] Date of Patent: Feb. 2, 1999

[54] ROTARY SPRAY APPARATUS

[76] Inventors: Terrance G. Barta, P.O. Box 161, Faribault, Minn. 55021; Gregory L. Barta, 6024 W. 233rd St., Morristown, Minn. 55052

[21] Appl. No.: 757,660

[22] Filed: Nov. 29, 1996

[51] Int. Cl.$^6$ ...................................................... B05B 3/00
[52] U.S. Cl. ....................... 239/263.1; 285/190; 134/123; 134/181; 239/264
[58] Field of Search ................................ 239/263.1, 264; 285/190, 281; 134/123, 180, 181

[56] References Cited

U.S. PATENT DOCUMENTS

| | | |
|---|---|---|
| 2,772,897 | 7/1956 | Shaw et al. . |
| 2,985,468 | 5/1961 | Shaw et al. ............................. 285/190 |
| 3,002,769 | 10/1961 | Deubler et al. . |
| 3,024,030 | 4/1962 | Koch . |
| 3,088,759 | 5/1963 | Corsette . |
| 3,210,099 | 10/1965 | Franck ..................................... 285/190 |
| 3,402,253 | 9/1968 | McCracken ........................ 285/190 X |
| 3,443,747 | 5/1969 | Jacobson et al. . |
| 3,750,749 | 8/1973 | Giroux . |
| 4,065,159 | 12/1977 | Leroy et al. . |
| 4,396,212 | 8/1983 | Honke . |
| 4,422,676 | 12/1983 | Sitabkhan . |
| 4,635,969 | 1/1987 | Jackson . |
| 4,965,920 | 10/1990 | Smith . |
| 5,080,401 | 1/1992 | Stich . |
| 5,607,189 | 3/1997 | Howeth .............................. 285/190 X |

*Primary Examiner*—Lesley D. Morris
*Attorney, Agent, or Firm*—Palmatier, Sjoquist, Voigt & Christensen, P.A.

[57] ABSTRACT

A rotary spray fluid apparatus anchorable to a car wash structure which has an elongate body portion with a side inlet and a rotatable hollow shaft extending therethrough defining an annular space with fluid transfer region, a pair of sealing regions and a pair of bearing regions. The shaft has a port adjacent the side inlet extending into an axial passageway in the shaft to flow to a spray head. Each sealing region has a pair of sealing rings. One ring of each pair of sealing rings is sealed to the body portion and the other is sealed to the rotatable shaft. A spring positioned in the fluid transfer region of the annular space provides an axial compressive force to maintain engaging faces of the sealing rings together as the shaft is rotated thereby sealing the annular space relative to the fluid flowing to the spray head.

20 Claims, 4 Drawing Sheets

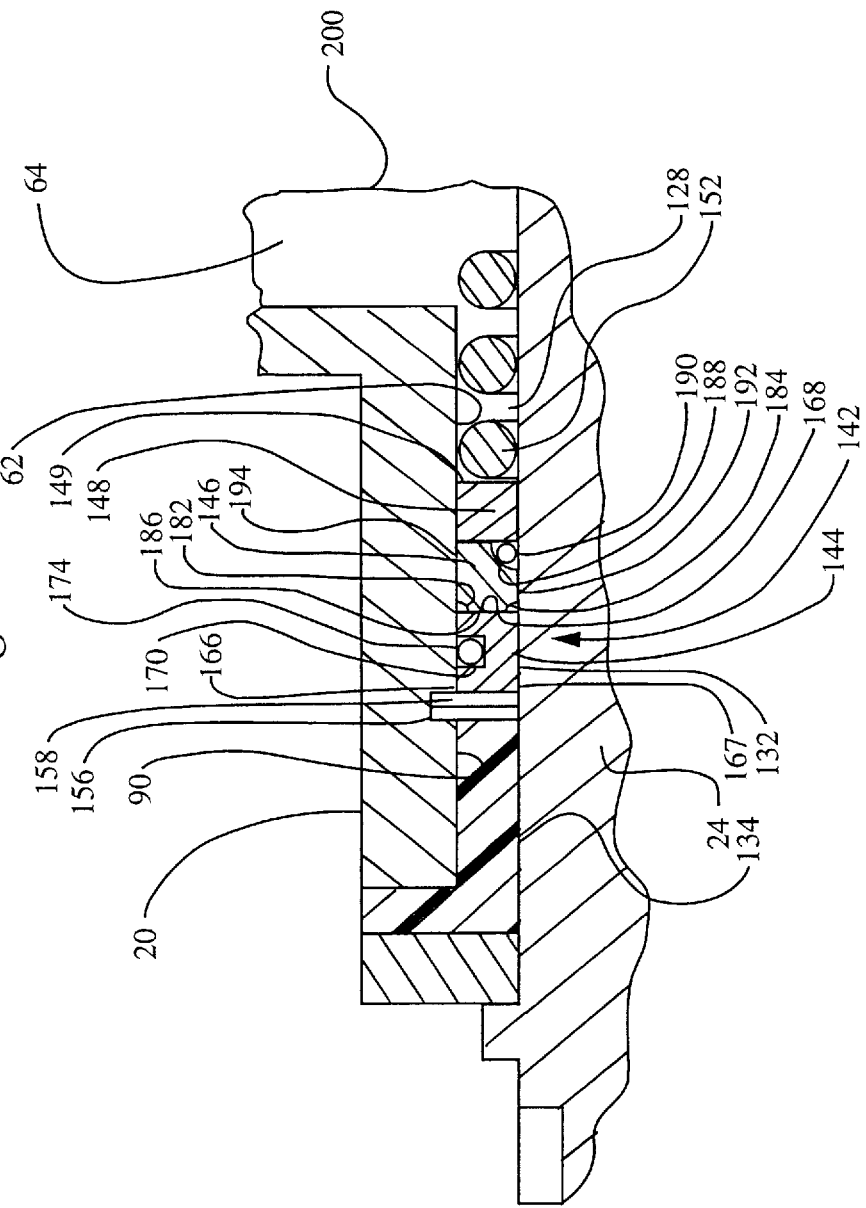

ROTARY SPRAY APPARATUS

BACKGROUND OF THE INVENTION

This invention relates to fluid spray equipment, more particularly it relates to rotary fluid spray apparatus for car washes.

Various rotary fluid spray apparatus have been employed for providing pressurized fluid spray to vehicles in automatic car washes. These apparatus spray fluids under pressure for cleaning, rinsing, waxing or other functions. These mechanisms are particularly appropriate for vehicle washes which do not utilize cloth or other materials which make contact with the exterior of the vehicle. In such "non-contact" automatic car washes a number of such apparatus will be utilized each with one or more spray nozzles directed toward the vehicle with the nozzle being rotated about an axis substantially parallel to the nozzle discharge direction to create a fast moving wide circular spray pattern. The fluid spray mechanism is moved longitudinally along the vehicle, either by moving the spray mechanism or the vehicle such that broad swaths on the vehicle exterior may be covered on each pass. Prior art rotary spray mechanisms have been high maintenance items requiring regular maintenance or replacement with seals being a particularly vulnerable portion of the mechanisms.

SUMMARY OF THE INVENTION

A rotary spray fluid apparatus anchored to a carwash structure directs a high pressure discharge in a circular pattern at a vehicle. The apparatus has an elongate body portion with a first end and a second end, has a bore extending from end, to end and has a side inlet communicative with the bore. A rotatable hollow shaft of a second diameter extends through the bore defining an annular space with fluid transfer region, a pair of sealing regions and a pair of bearing regions. The shaft has an intermediate portion with a port extending into an axial passageway in the bore. The shaft has a pair of sealing sections each positioned axially outward from the intermediate portion, and a pair of bearing sections, each positioned axially outward from the sealing regions. A pair of bearings each having a hollow cylindrical section sized for the annular space, and a collar portion to abut an end of body portion. A pair of shaft retaining portions retain the bearings and shaft in the body portion. Each annular sealing region has a pair of sealing rings with engaging faces in a radial plane. One of each pair of sealing rings sealed to the body portion and the other sealed to the rotatable shaft. A spring positioned in the fluid transfer region of the annular space provides an axial compressive force to maintain the engaging faces together. One end of the shaft is coupled to a radially extending spray head with a plurality of nozzles pointing generally in an axially direction. As a pressurized fluid is provided to the apparatus at the side inlet, the shaft is rotated at the end opposite to the end with the radially extending conduit.

A feature of the invention is the relatively simple configuration providing a highly robust design capable of handling high fluid pressures for extended periods of time.

An object and advantage of the invention is that the rotary fluid apparatus is reliable, low in maintenance and highly suitable in the car wash environment.

A feature of the invention is a uniform annular space which contains the bearings, the sealing components and the spring. The uniform annular space facilitates economical manufacture and compact configuration.

A feature of the invention is the advantageous use of ultra high molecular weight plastic bearings which are ideally suited for the high moisture environment associated with car washes. The collared hollow cylindrical design of the bearings facilitates easy manufacture and provides for easy assembly.

BRIEF DESCRIPTION OF THE DRAWINGS

FIG. 4 is a detail of a sectional view showing the annular space of the fluid coupling union and components therein.

DETAILED SPECIFICATION

Figure 1:
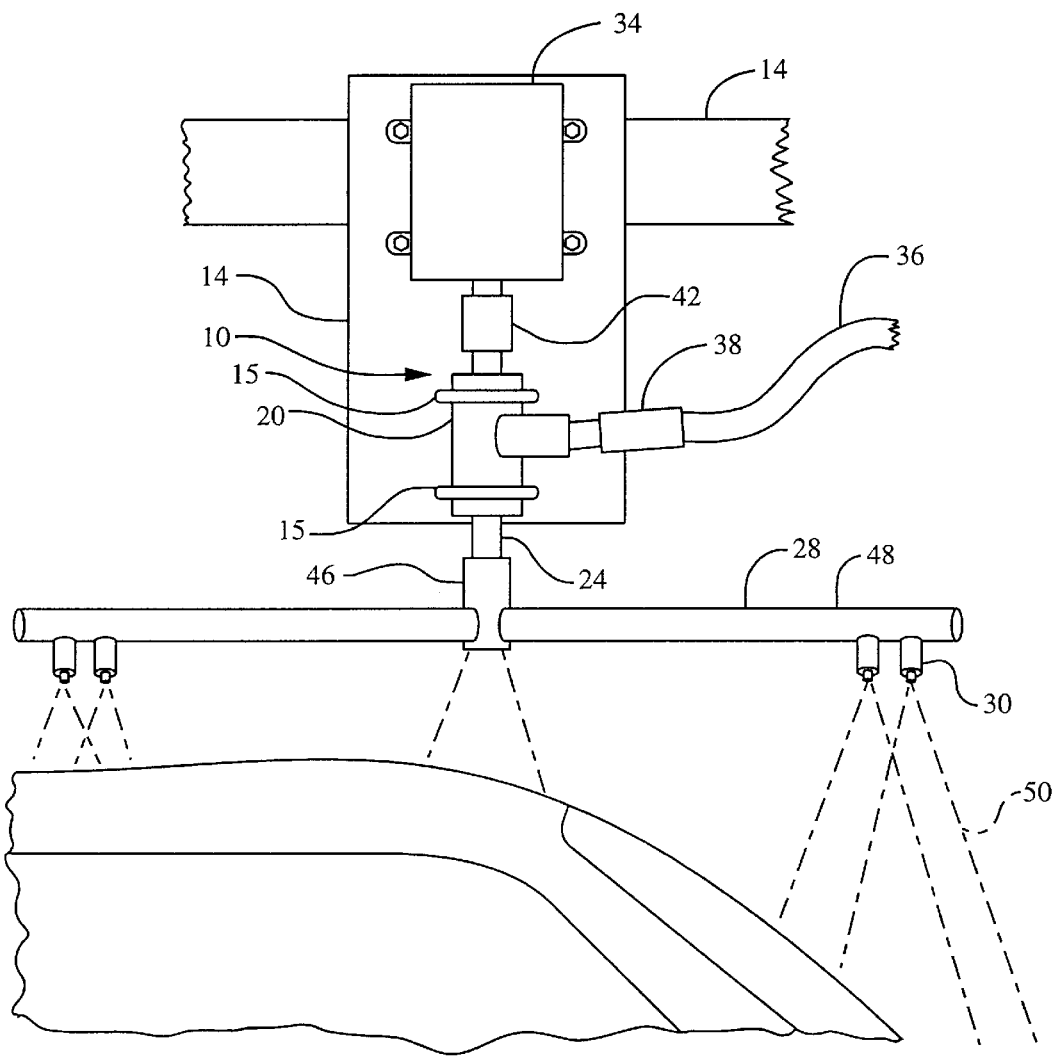
FIG. 1 is an elevational view of the rotatable spray wash apparatus positioned over a vehicle.
Figure 2:
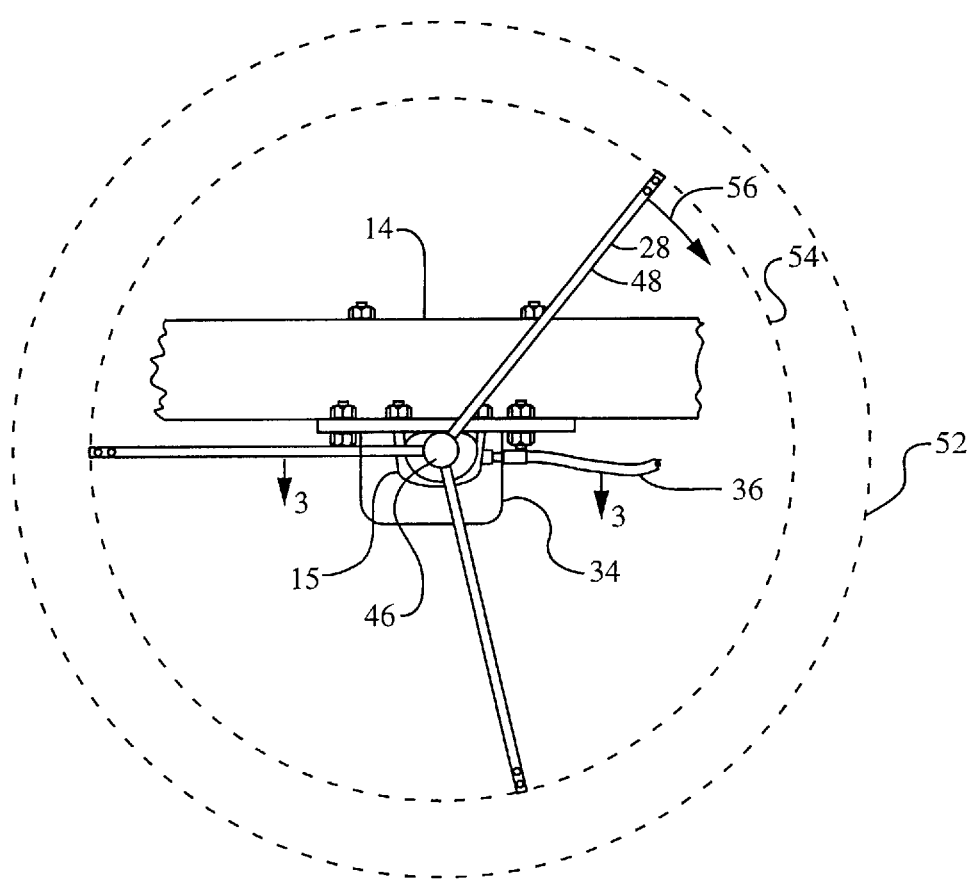
FIG. 2 is a bottom plan view of the apparatus of FIG. 1.

Referring to FIGS. 1 and 2 the rotary spray apparatus is shown and is generally designated with the numeral 10. The rotary spray apparatus is connected to a car wash structure 14 such as by U-bolts 15 and is shown positioned above a vehicle 16, although the apparatus is equally suitable for use on the sides of and below vehicles.

The rotary spray apparatus 10 is comprised principally of a fluid coupling union 18 with a body portion 20, a rotatable shaft 24, a spray head 28 having nozzles 30, and a motor 34. A fluid source 36 connects to the body portion 20 by way of a coupling assembly 38. The motor 34 is mechanically coupled to the rotatable shaft by a conventional coupling 42. The spray head 28 has a hub portion 46 and arms 48. The spray head sprays fluid such as water, soap and water, wax solutions and rinse solutions at the vehicle. The nozzle discharge 50 is in a pattern as illustrated by the dashed lines in FIG. 1. The sprays pattern is frusto-conical and at any distance from the spray head has a particular width such as indicated by the diameter of the dashed outer circle 52 in FIG. 2. FIG. 2 also illustrates the circular pattern of the rotatable spray conduits as shown by dashed lines 54.

The motor 34 typically will be an electrically powered motor although other types of motors would also be suitable such as pneumatic or hydraulic. The motor drives the rotatable shaft and thus causes the spray head 28 to revolve as shown by the arrow 56. The direction of rotation is generally not significant. Alternatively, the nozzles 30 may be tilted slightly from parallel to the shaft to provide a rotational force from the nozzle discharge 50.

Figure 3:
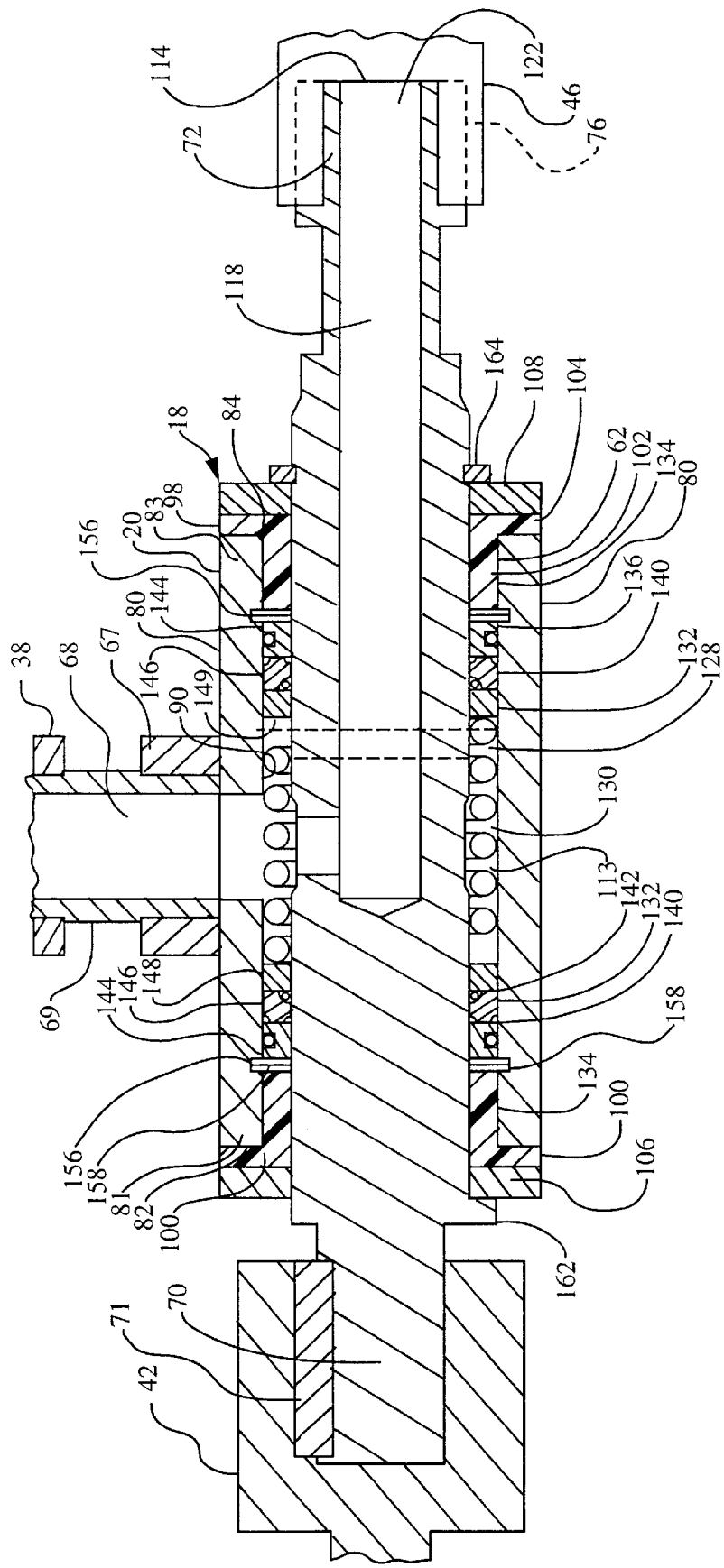
FIG. 3 is a cross-sectional view through the fluid coupling union of the apparatus taken at 3—3 of FIG. 2.

Referring to FIG. 3, a cross-sectional view of the fluid coupling 18 is shown. The fluid coupling 18 has the body portion 20 with a bore 62, and a side connection portion 67 with a side inlet 68. The side inlet is connected by way of a nipple 69 to the coupling assembly 38 by way of threaded connections. A driven end 70 of the rotatable shaft 24 is connected to the motor connector 42 by way of a key 71. The opposing outlet end 72 of the rotatable shaft 24 connects by way of threads 76 to the hub portion 46 of the spray head 28.

The body portion 20 has an exterior 80, a first end portion 81, a first end 82, and a second end portion 83, a second end 84, an interior 88 formed by the fluid inlet 68 and the bore 62, and an interior surface 90. The bore 62 has a first internal diameter as indicated by the dashed line designated with the numeral 94.

Abutting the ends 82, 84 of the body portion 20 are plastic bearings 98 and 100 formed out of ultra high molecular weight polyethylene, preferably oil impregnated. Such plastic is available from Pobco, Inc., 100 Hope Avenue, Worceter, Mass. 01603. Each bearing has a hollow cylindrical portion 102 and a collar portion 104. The end caps 106, 108 are configured as washers and are adjacent to the bearings 98, 100.

The rotatable shaft 24 extends through the body portion 20 and has a driveable end 112, a narrowed intermediate portion 113 and a fluid outlet end 114. A fluid passageway 118 configured as a bore extends from a fluid inlet 120 axially down the shaft 24 to communicate with a fluid outlet 122. The shaft has a second diameter indicated by the dashed line labelled 124. The shaft 24 and body portion 20 define an annular space 128. The first diameter 94 and second diameter 124 define an annular space 128. The annular space has an intermediate fluid transfer region 130, a pair of sealing regions 132, and a pair of bearing regions 134. Significantly, the annular space 128 is a uniform annular space 136 with uniform diameters at the bearing region and the sealing region. The uniform annular space facilitates assembly and ease of manufacture. At each sealing region 132 there is a set 140 of rings comprising cooperating sealing rings 142 comprising a first sealing ring 144, a second sealing ring 146 and a third spacer ring 148 which also functions as an O-ring retaining ring and also provides a spring engagement surface 149. Extending between the two sets of cooperating sealing rings is a spring 152 which spirals around the shaft 24. The spring 152 is shown as rotating with shaft in the configuration shown in the Figures.

The bore 62 in the body portion 20 has a pair of grooves 156 appropriately sized to accommodate internal conventional spiral spring retaining members configured as rings 158. A pair of shaft retainers 162, 164 on the shaft function to retain the shaft within the body portion 20 and to further generally secure the fluid coupling union 18 assembly together. The shaft retainer 162 at the first end 82 of the body portion 20 is shown configured as a shoulder with the retainer 164 at the second end 84 configured as a snap ring. Two snap rings or other configurations of retainers may also be suitable.

Referring to FIG. 4 details of the sealing region 132 and bearing region 134 of the annular space 128 are shown. The first sealing ring 144 abuts against the internal retaining member ring 158 and has a recess 170 with an O-ring 174. The first sealing ring 144 has an engaging surface 166 which is snugly fitted against the interior surface 90 and also has an inner surface 167 which is loosely fitted relative to the shaft 24. The first sealing ring has a sealing face 168 perpendicular to the shaft 24. The second sealing ring 146 has cut-away edge portions 182 and 184, a cooperating sealing face 186 and a recess 188 for an o-ring 190. The second sealing ring 146 has an inner facing shaft engaging face 192 which is snug against the shaft 24 and an outer surface 194 which is loosely fit relative to the inner surface 90 of the body portion 20. The third spacer ring 148 evenly distributes the spring 152 force, holds the O-ring 190 in place, is snug against the rotatable shaft 24, and is loose with respect to the body portion 20. When the fluid 200 in the inlet 64 and the annular space 128 is pressurized the fluid is retained within the fluid coupling by the set of sealing rings 140 and the O-rings 174, 190. The O-ring 190 seals the path of the fluid between the first sealing ring 144 and the shaft. The other O-ring 174 seals the fluid path between the second sealing ring 146 and the interior surface 90 of the body portion 20. The path between the first sealing ring 144 and the second sealing ring 146 is sealed by the cooperating sealing faces 168, 186. The cut-away edge portions 182, 184 on the second sealing ring 146 provide for even and stable wear of the cooperating sealing faces 186. The first sealing rings are suitably machined from stainless steel and the second sealing rings are suitably formed from high grade graphite such as AXF-5Q grade available from Poco Graphite, Inc., 1601 S. 8th Street, Decatur, Tex. 76234.

The motor 34 suitably drives the shaft at approximately 100 RPM's. The internal fluid pressure in the apparatus may approach 1,000 PSI which traditional seals cannot sustain for extended periods of time. Note that in the fluid coupling union the compressive load on the sealing faces 186, 168 is sustained both by the internal spiral spring retainers 158 and also by the retainers on the shaft.

The apparatus operates as follows: fluid under pressure from the fluid source 36 is provided to the side inlets 68 at the fitting portion 67. The fluid enters the interior 88 of the body portion and is sealed within the annular space 128 by way of the sealing faces as described above. The pressurized fluid enters the fluid passageway 118 and the rotating shaft 24 by way of the fluid inlet 120. The fluid under pressure then flows into the hub portion 46 out the arms 48 and is discharged by way of the nozzles 30. The high pressure spray in conjunction with the rotation of the spray head 28 provides an effective non-contact cleaning. The rotation of the spray head 28 on the shaft provides radial loading well within the range supportable by the UHMW polyethylene bearings 98, 100. Although the spray discharge from the nozzles does provide some axial loading this is readily absorbed by the internal spiral spring retaining rings 158 and the retainers 106, 164 on the shaft 24. Moreover, the motor 34 may be suitable engaged to support some of the axially loading on the shaft 24 due to the fluid spray force.

The center shaft and body portion and end caps may all suitably be machined from stainless steel for corrosion resistance.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A rotary spray apparatus for use in a car wash structure comprising:

a body portion anchorable to the car wash structure, the body portion having an exterior, a first end, and a second end with a bore extending from end to end and with a side inlet port communicative with the bore;

a shaft with a driveable end and an outlet end, the shaft extending through the body portion and concentrically spaced in the bore defining an annular space, the annular space having a fluid transfer region, a sealing region, and a bearing region, the shaft having an internal fluid passageway extending from a fluid inlet positioned at the fluid transfer region to the outlet end of the shaft;

a pair of plastic bearings each comprising a hollow cylindrical section and a collar portion, the cylindrical section positioned in the annular space with the collars at the ends of the body portion, the bearing engaging the shaft;

a pair of shaft retainers positioned outwardly of the body portion on the shaft for retaining the shaft within the body portion;

two sets of cooperating sealing rings positioned in the annular space, one set at each of the sealing regions, the cooperating sealing sets each comprised of a first rigid sealing ring sealingly engaged with the body portion, and a second rigid sealing ring sealingly engaged with the shaft, the first ring and second rings each having cooperative non-flexible sealing surfaces engaging each other;

a spring positioned in the annular space intermediate the two sets of cooperating sealing rings for compressively engaging the cooperating sealing faces thereby sealing the fluid transfer region from the exterior of the body portion;

a spray head connecting to and extending transverse the outlet end of the shaft, the spray head in fluid communication with the outlet end of the shafts, the spray conduit having at least one nozzle directed in a substantially axial direction; and a motor complied to the driveable end of the shaft for rotating the shaft and spray head.

2. The rotary spray apparatus of claim 1 wherein the bore in the body portion has a pair of grooves, one positioned axially outward of and adjacent to each set of cooperating sealing rings and wherein the apparatus further comprises a retaining ring positioned in each groove and engaging a sealing ring of each set, whereby the axial compressive force of the spring is supported by said retaining rings.

3. The rotary spray apparatus of claim 1 further comprising a pair of third spacer rings, each positioned in the annular space at an end of the spring whereby the spacer rings transfer the compressive force of the spring to each set of the cooperating sealing rings.

4. The rotary spray apparatus of claim 3 wherein each of the first sealing rings is sealingly engaged with the body portion by an O-ring disposed between each first sealing ring and the body portion.

5. The rotary spray apparatus of claim 4 wherein each of the second sealing rings are sealingly engaged with the shaft by an O-ring disposed between each second sealing ring and the shaft.

6. The rotary spray apparatus of claim 1 wherein the annular space at the sealing region and bearing region is a uniform annular space.

7. A rotary spray apparatus comprising:

a body portion having an exterior, a first end, and a second end with a bore extending from end to end and with a side inlet port communicative with the bore, the bore having a first diameter;

a shaft with two ends, one of said is an outlet end, the shaft extending through the body portion and having a second diameter less than the first diameter, the first and second diameters defining a uniform annular space, the uniform annular space having a sealing region and a bearing region;

a pair of bearings positioned in the uniform annular space, one positioned at each of the ends of the body portion, the bearing engaged with the body portion and further engaged with and supporting the shaft portion;

two sets of cooperating sealing rings positioned in the uniform annular space, one set at each of the sealing regions, the cooperating sealing sets each comprised of a first rigid sealing ring sealingly engaged with the body portion, and a second rigid sealing ring sealingly engaged with the shaft, the first ring and second ring having cooperating non-flexible sealing surfaces; and a spring positioned intermediate the two sets of cooperating sealing rings compressively engaging the cooperating sealing faces together thereby sealing the annular space from the exterior of the body portion.

8. The rotary spray apparatus of claim 7 further comprising a pair of shaft retainers positioned outwardly of the body portion on the shaft for axially fixing the shaft with respect to the body portion.

9. The rotary spray apparatus of claim 8 wherein one shaft retainer is configured as a shoulder on the shaft and the other shaft retainer is configured as a snap ring.

10. The rotary spray apparatus of claim 7, wherein each of the first sealing rings are substantially non-rotatable with respect to the shaft and substantially rotatable with respect to the body portion, and wherein each of the second sealing rings are substantially rotatable with respect to the shaft and substantially non-rotatable with respect to the body portion.

11. The rotary spray apparatus of claim 7 wherein each of the first sealing rings is sealingly engaged with the body portion by an O-ring disposed between each first sealing ring and the body portion and wherein each of the second sealing rings are sealingly engaged with the shaft by an O-ring disposed between each second sealing ring and the shaft.

12. The rotary spray apparatus of claim 7, wherein the bearings are comprised of a polyethelene hollow cylindrical section and an integral collar section.

13. A rotary fluid apparatus comprising:

a body portion anchorable to a structure, the body portion having an exterior, a first end, a second end, a bore extending from end to end, and with an inlet port intermediate the two ends communicative with the bore;

a shaft with two ends, one of said ends an outlet end, the shaft extending through the body portion and concentrically spaced in the bore defining an annular space, the annular space having a fluid transfer region, a pair of sealing regions, each axially outward from the fluid transfer region, and a pair of bearing regions, each bearing region positioned axially outward from the sealing regions, the shaft having an internal fluid passageway extending from a fluid inlet positioned at the fluid transfer region to the outlet end of the shaft;

two sets of cooperating sealing rings, one set positioned in each of the sealing regions of the annular space, the cooperating sealing sets each comprised of a first rigid sealing ring sealingly engaged with the body portion, and a second rigid sealing ring sealingly engaged with the shaft, the first ring and second rings having cooperative sealing surfaces sealingly engaging each other;

pair of plastic bearings each comprising a hollow cylindrical section, the bearings each engaging the body portion and positioned in the bearing region of the annular space, the shaft extending through and supported by said bearings; and a spring positioned in the annular space intermediate the two sets of cooperating sealing rings for compressively engaging the cooperating sealing faces of each set thereby sealing the fluid transfer region from the exterior of the body portion.

14. The fluid transfer apparatus of claim 13, further comprising a pair of shaft retention portions positioned at the ends of the body portion on the shaft for axially retaining the shaft with respect to the body portion.

15. The rotary fluid apparatus of claim 14 wherein each of the first sealing rings are substantially non-rotatable with respect to the shaft and substantially rotatable with respect to the body portion, and wherein each of the second sealing rings are substantially rotatable with respect to the shaft and substantially non-rotatable with respect to the body portion.

16. The rotary fluid apparatus of claim 15 further comprising a pair of O-rings for sealingly engaging the first sealing rings to the body portion, and further comprising another pair of O-rings for sealingly engaging the second sealing rings to the shaft.

17. The rotary fluid apparatus of claim 16, wherein the bore in the body portion has a pair of grooves, one positioned axially outward of and adjacent to each set of cooperating sealing rings and wherein the apparatus further comprises a retaining ring positioned in each groove and engaging one of the two sealing rings of each set, whereby the axial compressive force of the spring is supported by said retaining rings.

18. The rotary fluid apparatus of claim 13 wherein the annular space at the sealing region and bearing region is a uniform annular space.

19. The rotary fluid apparatus of claim 13 further comprising a spray head having a plurality of nozzles, the spray head connected to the outlet end of the rotatable shaft and in fluid communication therewith.

20. The rotary fluid apparatus of claim 19 wherein at least one nozzle is directed at least partially in a circumferential direction whereby a rotational force is provided to the spray head and rotatable shaft during operation.

* * * * *